(12) United States Patent
Karkos, Jr.

(10) Patent No.: US 6,216,968 B1
(45) Date of Patent: Apr. 17, 2001

(54) DRAINAGE SYSTEM FOR A FOOD PROCESSING MACHINE

(75) Inventor: John F. Karkos, Jr., Lisbon Falls, ME (US)

(73) Assignee: Island Oasis Frozen Cocktail Company, Inc., Walpole, MA (US)

( * ) Notice: Subject to any disclaimer, the term of this patent is extended or adjusted under 35 U.S.C. 154(b) by 0 days.

(21) Appl. No.: 09/339,765

(22) Filed: Jun. 24, 1999

(51) Int. Cl.[7] .................................................. B02C 18/00
(52) U.S. Cl. .............................. 241/101.2; 241/DIG. 17
(58) Field of Search ........................... 241/95, 101.2, 241/DIG. 17

(56) References Cited

U.S. PATENT DOCUMENTS 3,552,663 * 1/1971 Royals ......................... 241/DIG. 17
4,681,030 * 7/1987 Herbert ................................. 99/484
4,998,677 * 3/1991 Gallaher ........................ 241/DIG. 17

* cited by examiner

Primary Examiner—Mark Rosenbaum
(74) Attorney, Agent, or Firm—Foley, Hoag & Eliot LL (57) ABSTRACT

A drainage system for a food processing machine comprises a drain pan located at the base of the machine, the drain pan receiving unwanted liquid from various locations in the machine, and permitting the removal of the unwanted liquid from the machine. In a preferred embodiment, the drain pan is employed in an ice shaver/blender machine and receives unwanted liquid generated by the melting of ice stored in the ice hopper, unwanted liquid spilled in the shaver and blender areas, and unwanted liquid collected within the main body of the machine. The drain pan includes a plurality of outlets which may be selectively chosen to facilitate routing the unwanted liquid out of the machine in a desired direction.

13 Claims, 6 Drawing Sheets

DRAINAGE SYSTEM FOR A FOOD PROCESSING MACHINE

FIELD OF THE INVENTION

This invention relates to machines for cutting or processing food, and particularly to such machines that require a drainage system to remove unwanted liquids from the machine.

BACKGROUND OF THE INVENTION

Many food processing machines produce unwanted liquids that leak, spill, or otherwise find their way onto or into the machine, and it is required that the liquids be drained off promptly to prevent disruption of the machine operation. Drink-making machines that process ice and/or liquids are particularly susceptible to leakage or spillage of liquid. Moreover, in an ice/shaver blender machine, the hopper at the top of the machine is generally kept relatively full of ice so that, when a frozen drink is ordered, the machine can be operated immediately to produce the desired frozen drink. While the ice sits in the hopper, it melts, and the resultant water must be drained from the hopper if the machine is to work properly.

The frozen drink machine disclosed in U.S. Pat. No. 4,681,030 provides for drainage of the melted ice as well as of other unwanted liquid. Water from melted ice collects in a drip tray located under the ice shaver portion of the machine, the collected water then flowing through a hole in the drip tray downward through a first drainage hose. Liquid spilled in the area of the blender flows through a perforated panel at the front of the machine, onto a drain deck that includes two drain holes attached to a second drainage hose. These two drainage hoses join at a y-connector to feed a third hose exiting from the rear of the apparatus.

While drain constructions like that of U.S. Pat. No. 4,681,030 provide adequate drainage, they present several undesirable drawbacks. Water collected in the drip tray and in the drain deck may not flow immediately out of the machine. Cleaning the drain hoses inside the machine, the drip pan, and the drain deck is troublesome. And the construction of the drain system is relatively complicated, with multiple hoses and connectors.

It is therefore an object of the present invention to provide a drainage system for a food processing machine that quickly and reliably removes the undesirable liquid from the machine.

It is another object of the invention to provide a drainage system that is compact, easy to clean, and relatively inexpensive to construct and repair.

It is still another object of the present invention to provide a drainage system that permits a convenient choice of directions for the drain outlet hose.

SUMMARY OF THE INVENTION

The drainage system of the present invention comprises a drain pan located at the base of the machine, the drain pan receiving unwanted liquid from various locations within the machine and permitting the ready removal of the unwanted liquid from the machine. In a preferred embodiment, the drain pan is employed in an ice shaver/blender machine and receives unwanted liquid generated by the melting of ice stored in the ice hopper, unwanted liquid spilled in the shaver and blender areas, and unwanted liquid collected within the main body of the machine. The drain pan includes a plurality of outlets that may be selectively chosen to facilitate routing the unwanted liquid out of the machine in a desired direction.

DETAILED DESCRIPTION OF THE INVENTION

Figure 1:
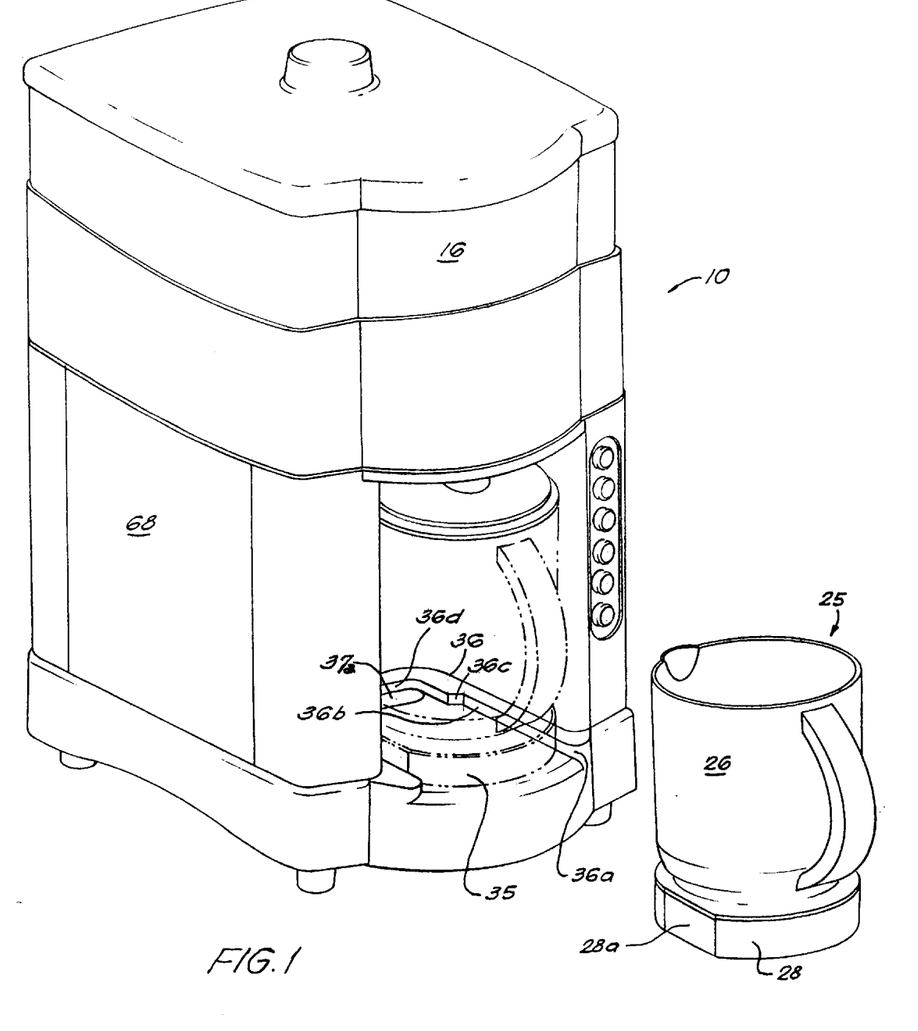
FIG. 1 is a perspective view of an ice shaver/blender machine and a removable blender cup, illustrating in dashed lines the position of the blender cup when it is positioned in the machine.
Figure 2:
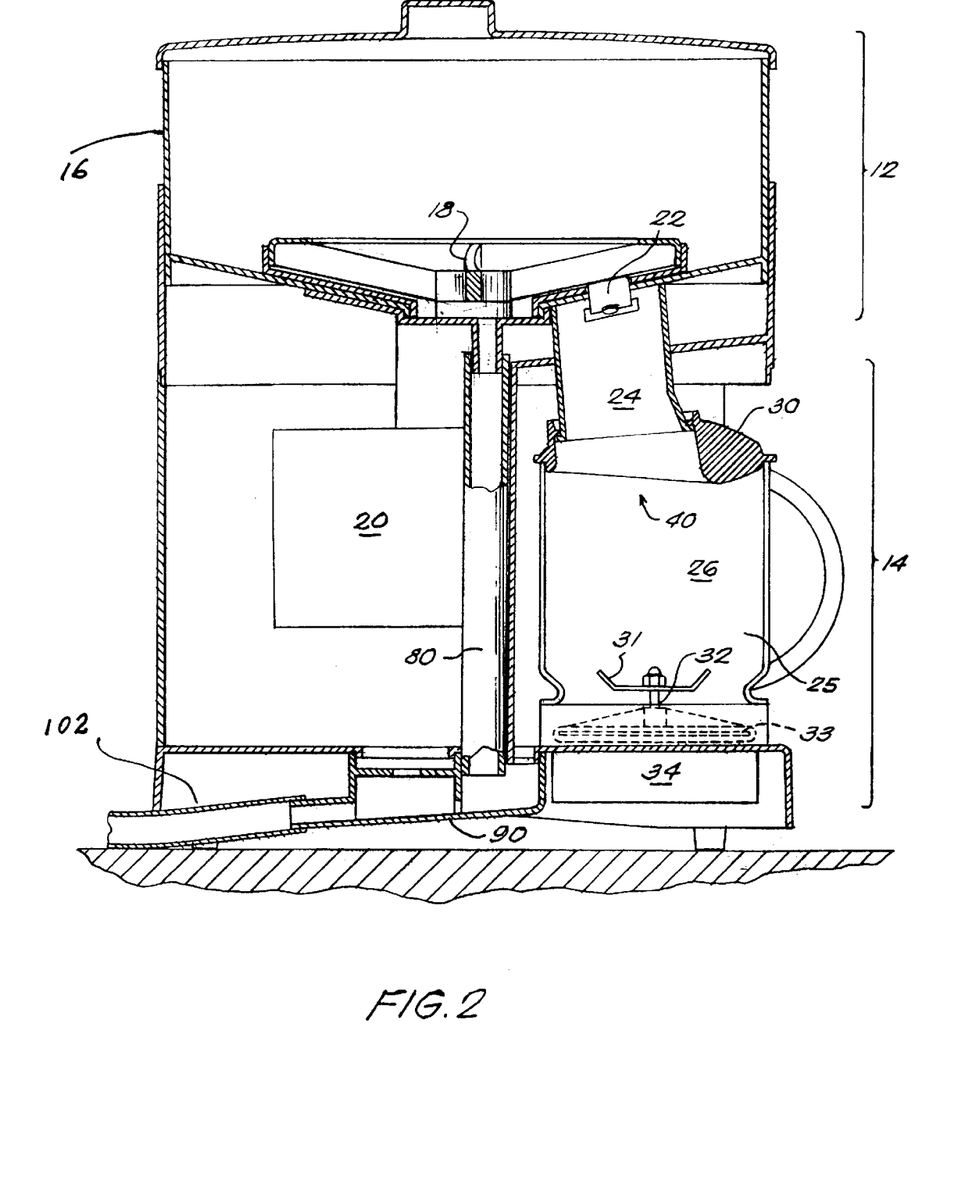
FIG. 2 is a representational sectional view of the shaver/blender machine of FIG. 1, with the blender cup in position under the ice shaver spout, a drainage hose being connected to the drain hole below the shaver mechanism and communicating with an aperture in the top of the drain pan, the drain pan being shown in partial sectional view at the base of the machine.

Machine 10 for making frozen drinks, depicted in FIGS. 1 and 2, comprises an ice shaver shown generally at 12, mounted above a blender assembly shown generally at 14. A blender cup 25 may be positioned in machine 10 by sliding the base 28 of the blender cup toward the back of the blender platform 35. As illustrated in FIG. 1, a shoulder 36 projecting upwardly around the perimeter of blender platform 35 has rounded outer ends 36a that cooperate with a flat area 28a on each side of blender cup base 28 to guide blender cup 25 into proper position as it is slid into the machine. Shoulder 36 further includes straight sections 36b that cooperate with flat areas 28a on blender cup base 28 to prevent cup 25 from rotating or otherwise moving when the blender is operated. Inwardly curved portions 36c on each side near the back of the blender platform 35 serve as a stop against further inward movement of blender cup 25, thereby ensuring proper final positioning of the cup under ice chute 24 (FIG. 2). A drain hole 37 (FIG. 5) located at the bottom of a recessed area 37a just in front of shoulder rear wall 36d (FIG. 1) permits any spilled liquid to drain off into drain pan 90, described in detail below.

Ice cubes or chips contained in hopper 16 are driven by rotating pusher blade 18 powered by motor 20, the cubes or chips striking shaving blade 22, all in known fashion. The shaved ice particles travel through attached chute 24 into blender cup 25 though an aperture 40 in the cover 30 seated on blender cup 25. When the machine is activated, d.c. motor 34 causes magnetizable disk 33, housed in blender cup base 28 and axially attached to shaft 32, to rotate, causing impeller 31 attached to shaft 32 to likewise rotate within container 26 of blender cup 25, to blend the shaved ice particles and other drink ingredients that have been introduced into the blender cup. Upon completion of the desired blending, blender cup 25 may be removed from the machine, and the blended drink served to customers.

Figure 3:
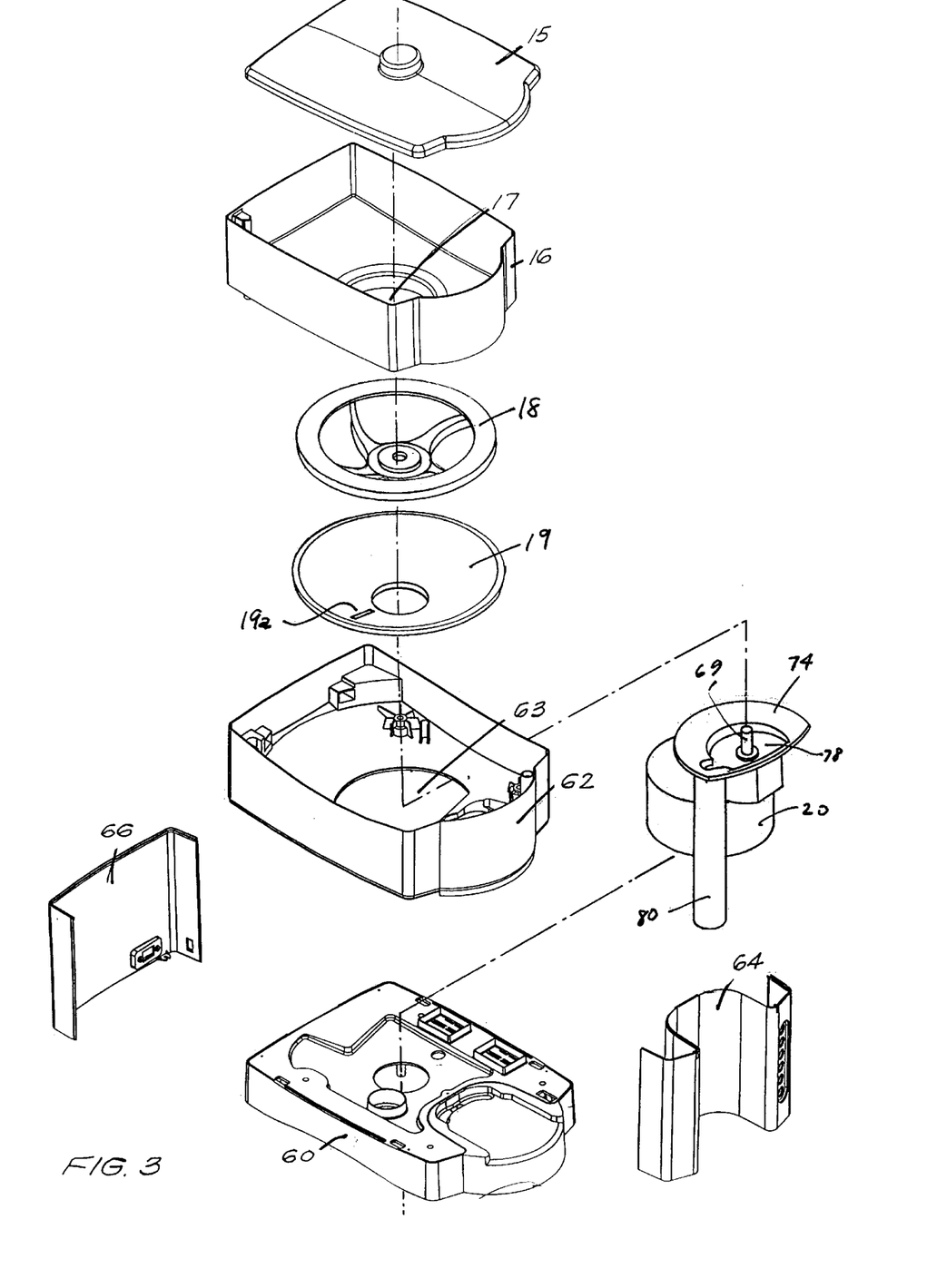
FIG. 3 is an exploded perspective view of the principal components of the shaver/blender machine.

As shown in FIG. 3, the machine principally comprises a machine base 60 and an ice shaver base 62 attached to and spaced apart by four vertical support rods or columns (not shown). Front panel 64, rear panel 66, and two side panels like that shown at 68 in FIG. 1, mate with machine base 60 and ice shaver base 62 to form an enclosure for the machine motors and electronics. Side panel 68 is removable to permit ready access to drain hose 80 and the interior of the machine. A similar panel on the opposite side of the machine is likewise removable to allow access to an electronic control board mounted just behind that panel. Pusher blade 18 is attached to rotating shaft 69 of motor 20, the shaft projecting through aperture 63 in shaver base 62, and through the center aperture in conical shaver pan 19 affixed to shaver base 62 and within which the pusher blade 18 rotates. Shaver blade 22 projects upwardly into shaver pan 19 through the slot 19a in pan 19.

Ice hopper 16 seats within ice shaver base 62 atop shaver pan 19 and pusher blade 18, the aperture 17 in hopper 16 permitting the ice cubes or chips to fall into contact with pusher blade 18. The bottom of hopper 16, shaver pan 19, and the bottom of ice shaver base 62 are relatively steeply pitched toward the center of the machine to ensure good drainage of liquid. Hopper cover 15 sits atop hopper 16. The machine base 60, the front, back, and side panels 64, 66, and 68, shaver base 62, hopper 15, and hopper cover 16 are made of high impact plastic, hopper 15 and hopper cover 16 preferably being transparent. Pusher blade 18 and shaver pan 19 are preferably made of die-cast aluminum.

Figure 4A:
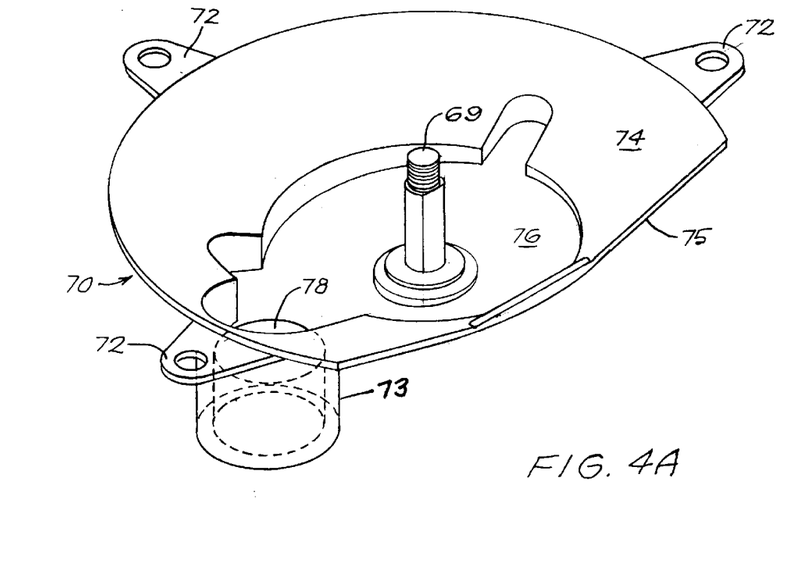
FIG. 4a is a perspective view of the top of the housing for the ice shaver motor, which motor housing is attached to the bottom of the ice shaver base.
Figure 4B:
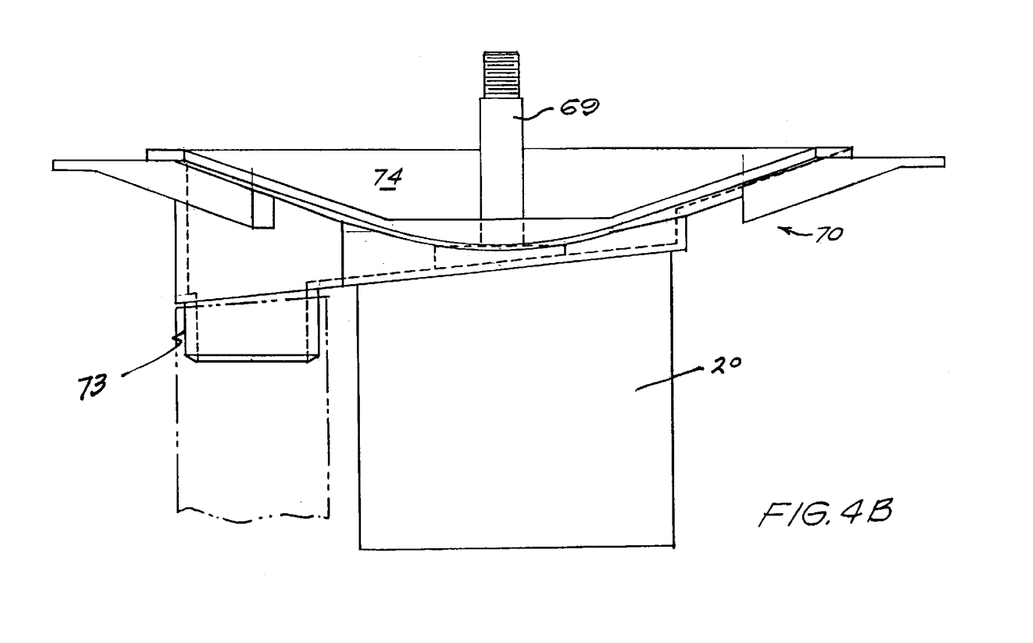
FIG. 4b is a front elevation view of the housing for the ice shaver motor in the area of attachment to the ice shaver base.

FIGS. 4a and 4b depict the top of housing 70 of motor 20, which housing is affixed to the underside of ice shaver base 62 by means of fasteners attached through flanges 72. As seen in FIG. 3, the front edge of aperture 63 in ice shaver base 62 is substantially parallel with the front of the machine, and fits tightly against edge 75 on housing 70; likewise the curved portion of housing 70 aligns with and fits tightly to the remaining curved portion of aperture 63, so that, when housing 70 is attached to ice shaver base 62, an adequate seal is obtained. The upper surface 74 of housing 70 is inclined toward shaft 69, the shaft being surrounded by a recessed area 76 having a drain hole 78, the recessed area itself also being pitched toward drain hole 78. Unwanted liquid in ice hopper 16 will flow through aperture 17 into recessed area 76; unwanted liquid in shaver pan 19 and ice shaver base 62 will flow onto surface 74 and then into recessed area 76. All unwanted liquid will then flow out drain hole 78 and into drain hose 80, attached under drain hole by force fit onto tubular collar 73 surrounding drain hole 78 and extending downwardly from housing 70. Drain hose 80 directs this unwanted liquid to drain pan 90, as explained below.

Figure 5:
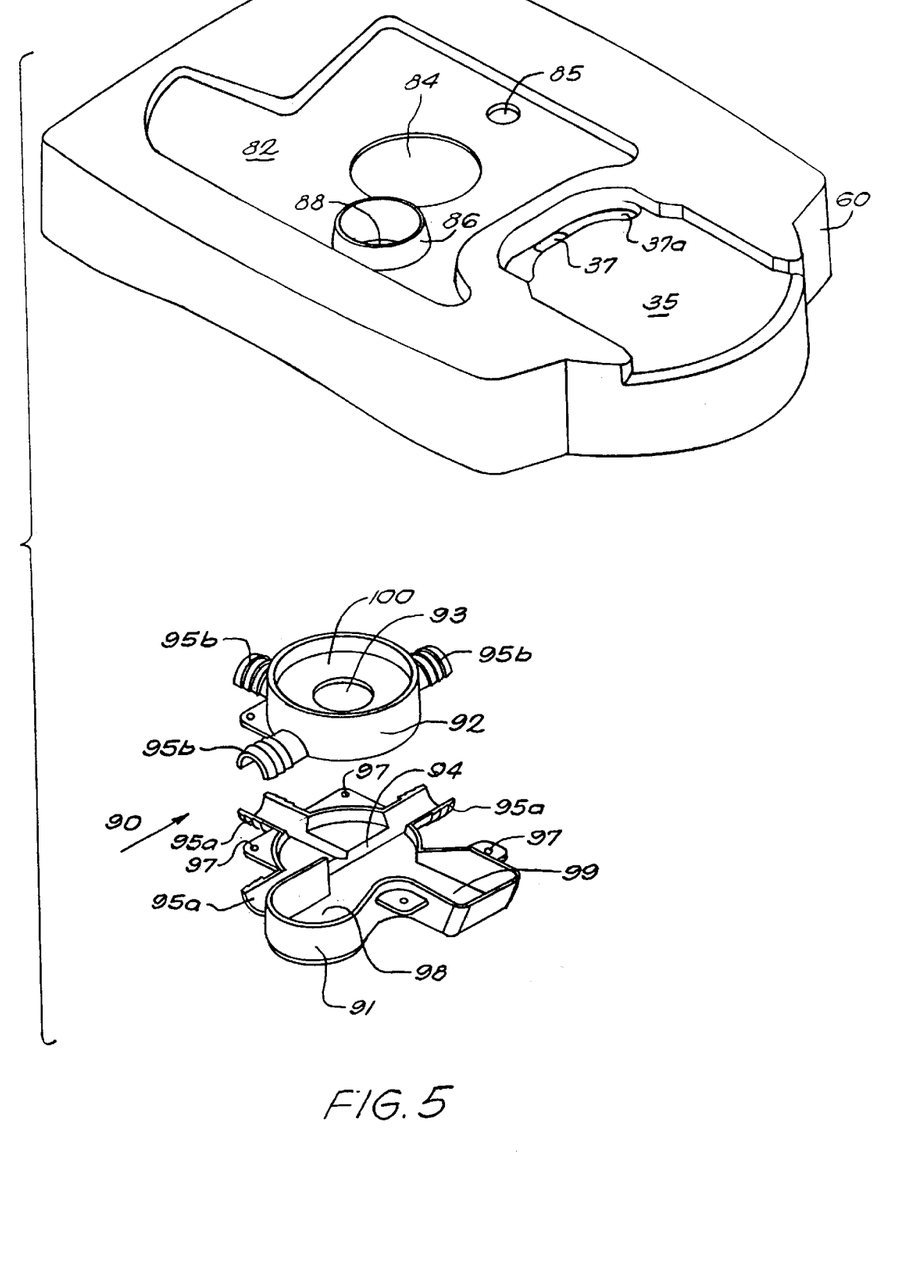
FIG. 5 is an exploded perspective view of the drain pan for the machine, in position under the base of the machine.

Turning to FIG. 5, the upper side of machine base 60 includes a recessed area 82 having large aperture 84 and small aperture 85 therethrough, the purpose of which apertures will be explained below. Circular collar 86 surrounds a third aperture 88 through recessed area 82, this third aperture being aligned with drain hole 78 in motor housing 70 so that drain hose 80 attached below drain hole 78 may pass through machine base 60 via aperture 88, with circular collar 86 preventing dislodgement or sideways movement of hose 80. Drain pan 90 is attachable to the underside of machine base 60 (see FIG. 6) and comprises an upper section 92 matable with a lower section 91, each molded of high impact plastic. These sections may be welded together, or alternatively will be held together when drain pan 90 is affixed to the underside of machine base 60 via fasteners introduced through the holes in flanges 97 of lower section, and into corresponding projections from machine base 60 (not shown). When drain pan 90 is so attached, the upper circular rim at the top of upper section 92 is flush with the underside of machine base 60. As made clear in FIG. 6, drain pan 90 is positioned so that aperture 93 in upper section 92 is centered on aperture 84 of machine base 60.

Figure 6:
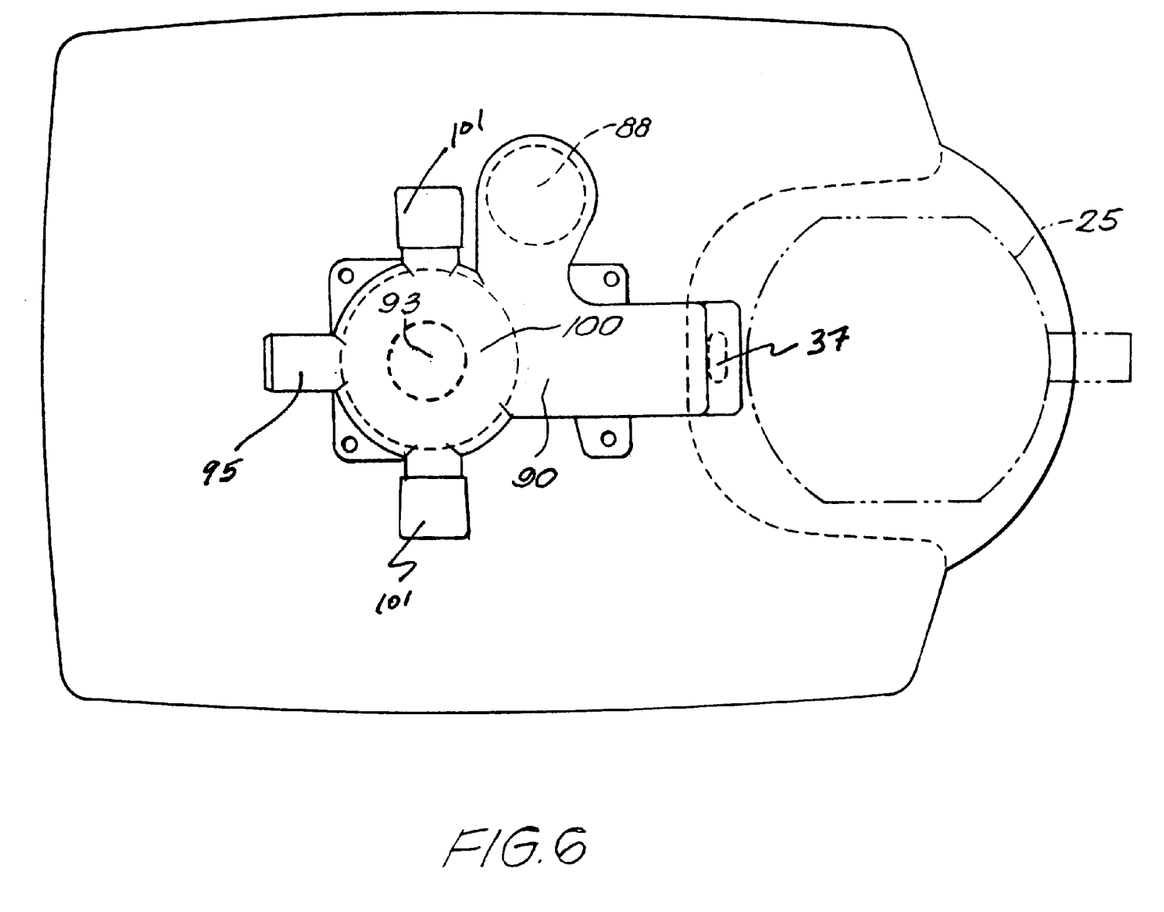
FIG. 6 is a bottom plan view of the machine, with the drain pan in position, and with two of the drain pan outlets plugged, while the third is ready for connection to an exit drain hose.

When upper section 92 and lower section 91 of drain pan 90 are mated, curved portion 98 and square portion 99 remain open at their tops, the top edge of each portion being substantially flush against the underside of machine base 60 when drain pan 90 is attached. Curved portion 98 receives the lower end of drain hose 80 so that unwanted liquid from the ice shaver portion of the machine is delivered into drain pan 90. Square portion 99 is located under drain hole 37 at the rear of blender platform 35, so that unwanted liquid spilled in the blender area will flow into recessed area 37a of at the rear of blender platform 35, then through hole 37 into drain pan 90. The recessed area 82 of machine base 60 is pitched toward aperture 84, so that unwanted liquid that collects in the machine base flows or falls into recess 82, then flows through aperture 84 onto circular rim 100 and then through aperture 93 into drain pan 90.

Thus the drainage system of the instant invention, in the particular embodiment here illustrated and described, permits unwanted liquids to be drained from ice hopper 16, shaver pan 19, and ice shaver base 62, from blender platform 35, and from machine base 60, the unwanted water being directed into drain pan 90 and then out of the machine. Since it may be desirable, depending on the location of the machine on a bar counter or other table, to drain off the unwanted water in a particular direction, in the embodiment here shown, drain 90 is provided with three outlet arms 95. By stoppering one or more of the outlet arms by means of soft rubber caps 101 that may be removably fitted over the arms, the user may choose the direction for the outflow of liquid; the unplugged outlet arm or arms may each receive an exit drain hose 102 (as shown in FIG. 2) through which the unwanted liquid may be removed. T-shaped channel 94 in drain pan 90 assists in directing the unwanted water out of the machine.

The drainage system further includes several "emergency" exits for unwanted liquid, should drain pan 90 become clogged or should exit drain hose 102 become crimped or otherwise stop functioning. Lower section 91 of drain pan 90 includes a notched area 96 at the inner edge of square portion 99, which notched area remains open when drain pan 90 is attached to machine base 60. Thus should the level of liquid in drain pan 90 rise above the lowest point of that notched area 96, the liquid will begin to spill out of drain pan 90 and onto the countertop or table on which the machine sits. Moreover, if, for some reason the unwanted liquid begins collecting in recessed area 82 of machine base 60, small aperture 85, located on the upper pitch of recessed area 84, serves as a "safety valve" to allow this collected liquid to exit the machine and to spill out onto the countertop. It is not anticipated that these two "emergency" routes for disposal of the unwanted liquid will be often needed, since the drainage system here described is simple in construction and not likely to become clogged during ordinary usage of the machine.

In the preferred embodiment here described, drain hose 80, which is attached to the underside of shaver motor housing 70, is a standard flexible plastic hose having an inner diameter of 1½ inches and a length of about 10½ inches. Drain hole 78 has a diameter of 1¼ inches. In the machine base 60, large aperture 88 is 3 inches in diameter, aperture 84 is 2 inches in diameter, and small aperture 85 is ¾ inch in diameter. Drain hole 37 at the rear of blender platform 36 is substantially rectangular, of dimensions ⅜ inch by ⅞ inch.

Turning to drain pan 90, the circular portion of upper section 92 is 3 and ⅜ inches in outer diameter, and has an aperture 93 that is 1 and ⅜ inches in diameter. Curved portion 98 of lower section 91 has a diameter of about 1¾ inches, and square portion 99 is about 2 inches square. Outlet arms 95 have an inner diameter of about ¾ inch. Drain pan 90 is about 1 and ⅞ inches in height.

It will be readily appreciated by those skilled in the art that the present invention in its broader aspects is not limited to the specific embodiments herein shown and described. Accordingly, variations may be made from the embodiments described herein which are within the scope of the accompanying claims, without departing from the principles of the invention and without sacrificing its chief advantages.

I claim:

1. In a machine for making frozen drinks comprising an ice shaver and a blender, and having a hopper for storing ice to be processed by the machine, and a machine body that houses the motor or motors that drive the ice shaver and the blender, a drainage system comprising means for collecting unwanted liquid produced by the melting of the ice;

means for collecting unwanted liquid from the vicinity of the blender, means for collecting unwanted liquid from the vicinity of the ice shaver, means for collecting unwanted liquid from within the machine body; and a drain pan;

each of said collecting means including means for routing said collected unwanted liquid to said drain pan, said drain pan including at least one outlet by which said unwanted liquid received from said collecting means may be removed from the machine via the drain pan.

2. The drainage system of claim 1, wherein the hopper sits upon an upper wall of the main body of the machine, the upper wall and the base of the hopper being pitched downward toward an axially aligned aperture in each of their approximate centers, the apertures communicating with a recessed plate attached to the underside of said upper wall and having a like pitch toward its center, the recessed plate including a drainage aperture, whereby liquid produced by the melting of ice in the hopper or otherwise in the vicinity of the ice shaver is directed through said apertures in the upper wall and the hopper base onto said recessed plate, and thence through said drainage aperture.

3. The drainage system of claim 2, wherein the blender includes a blender platform on which a blender cup is positioned during operation of the machine, the blender platform including a recessed area having a drainage aperture therein for receiving unwanted liquid from the blender platform and routing said liquid through said drainage aperture to said drain pan.

4. The drainage system of claim 3, wherein the main body includes a bottom wall having a recessed area formed therein for receipt of unwanted liquids from the main body of the machine, the recessed area being pitched generally toward the center of the machine where a first drainage aperture is located, said unwanted liquid being routed out of said recessed area via drainage aperture to said drain pan.

5. The drainage system of claim 4, wherein said drain pan is affixed to the underside of the bottom wall of the machine body, and includes a portion located directly under said drainage aperture in said blender platform, a portion communicating via a drain hose with said drainage aperture in said recessed plate, and a portion communicating with said drainage aperture in said bottom wall of said main body, to receive the unwanted liquid therefrom.

6. The drainage system of claim 5, wherein said drain pan includes means for selectively removing the unwanted liquid from the drain pan in one or more directions.

7. The system of claim 6, wherein said selective removal means comprising a plurality of arms extending from said drain pan, each arm having a longitudinal aperture therein for permitting the unwanted liquid to flow therethrough, and one or more caps for stoppering all of the arms other than the arm or arms providing drainage in the desired direction.

8. The system of claim 5, wherein said drain pan includes an opening located in a side wall above the bottom of the pan to permit unwanted liquid collected in the drain pan to exit the machine should the level of liquid in the drain reach that of the opening.

9. The system of claim 5, further comprising a second aperture in said recessed area in the bottom wall of the main body, the second aperture being located farther from the center of the machine than the first aperture, so that, should the unwanted liquid be unable to flow through the aperture at the center of the recessed area and thereby collect in the recessed area, the second aperture will permit the collected liquid to exit the machine when it reaches the level of the second aperture.

10. The system of claim 4, wherein said recessed area in said machine base includes a passage therethrough to permit the drain hose from the recessed plate to communicate with said drain pan.

11. The drainage system of claim 1, wherein said drain pan includes means for selectively removing the unwanted liquid from the drain pan in one or more directions.

12. The system of claim 11, wherein said selective removal means comprising a plurality of arms extending from said drain pan, each arm having a longitudinal aperture therein for permitting the unwanted liquid to flow therethrough, and one or more caps for stoppering all of the arms other than the arm or arms providing drainage in the desired direction.

13. In a food processing machine having a drain pan for collecting unwanted liquid from within the machine, the improvement comprising means for selectively removing the unwanted liquid in one or more desired directions, said means comprising a plurality of arms extending from the drain pan, each arm having a longitudinal aperture therein for permitting the unwanted liquid to flow therethrough, and one or more caps for stoppering all of the arms other than the arm or arms providing draining in the desired direction or directions.

\* \* \* \* \*

UNITED STATES PATENT AND TRADEMARK OFFICE
CERTIFICATE OF CORRECTION

PATENT NO.  : 6,216,968 B1
DATED       : April 17, 2001
INVENTOR(S) : Karkos, Jr.

It is certified that error appears in the above-identified patent and that said Letters Patent is hereby corrected as shown below:

Column 1,
Line 25, replace "Pat. No." with -- Patent --
Line 36, replace "Pat. No." with -- Patent --

Column 4,
Line 17, replace "of at the rear" with -- at the rear --

Column 5,
Line 4, replace "3 and 3/8" with -- $3\frac{3}{8}$ --

Signed and Sealed this

Eleventh Day of March, 2003

JAMES E. ROGAN
*Director of the United States Patent and Trademark Office*